(12) United States Patent
Carriero

(10) Patent No.: US 10,121,155 B2
(45) Date of Patent: *Nov. 6, 2018

(54) MEASURING QUALITY OF USER INTERACTION WITH THIRD PARTY CONTENT

(71) Applicant: Facebook, Inc., Menlo Park, CA (US)

(72) Inventor: Thomas Giovanni Carriero, San Francisco, CA (US)

(73) Assignee: Facebook, Inc., Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/652,738

(22) Filed: Jul. 18, 2017

(65) Prior Publication Data

US 2017/0316428 A1    Nov. 2, 2017

Related U.S. Application Data

(63) Continuation of application No. 12/848,844, filed on Aug. 2, 2010, now Pat. No. 9,747,605.

(51) Int. Cl.
  *G06Q 30/00* (2012.01)
  *G06Q 30/02* (2012.01)

(52) U.S. Cl.
  CPC ......... *G06Q 30/02* (2013.01); *G06Q 30/0277* (2013.01); *G06Q 30/0283* (2013.01)

(58) Field of Classification Search
  CPC .............................. G06Q 30/02; G06F 3/0482
  USPC .................................. 705/14.73, 14.1, 14.4
  See application file for complete search history.

(56) References Cited

U.S. PATENT DOCUMENTS

| 6,275,854 B1 | 8/2001 | Himmel et al. |
| 2006/0031466 A1 | 2/2006 | Kovach |
| 2007/0050251 A1 | 3/2007 | Jain et al. |
| 2008/0177600 A1 | 7/2008 | McCarthy et al. |

OTHER PUBLICATIONS

United States Office Action, U.S. Appl. No. 12/848,844, dated Oct. 22, 2015, 34 pages.
United States Office Action, U.S. Appl. No. 12/848,844, dated Jun. 3, 2015, 19 pages.
United States Office Action, U.S. Appl. No. 12/848,844, dated Apr. 30, 2013, 17 pages.
United States Office Action, U.S. Appl. No. 12/848,844, dated Oct. 5, 2012, 16 pages.

*Primary Examiner* — Sun M Li
(74) *Attorney, Agent, or Firm* — Fenwick & West LLP

(57) ABSTRACT

An online services system provides monitoring of user interaction with third-party content. The monitoring is performed by a script in a web page provided by the online services system, which script provides a timer invoked when the browser leaves the online services system's page for a page comprising third party content. When the online services system serves the page, the browser reads the HTML to render the page, including the script with the timer. When the user leaves the online services system page, the timer begins, and when the browser returns to a page provided by the online services system, the timer ends and duration information from the timer is provided to the online services system. Applications include measurement of the quality of interaction between users and a third party advertisers, in which time spent viewing third party content is a proxy for the quality of the interaction.

20 Claims, 5 Drawing Sheets

FIG. 4A

MEASURING QUALITY OF USER INTERACTION WITH THIRD PARTY CONTENT

CROSS REFERENCE TO RELATED APPLICATIONS

This application is a continuation of co-pending U.S. application Ser. No. 12/848,844, filed Aug. 2, 2010, which is incorporated by reference in its entirety.

BACKGROUND

This invention relates generally to online services, and in particular to measuring a user's interaction with content on an external domain, such as an advertisement, accessed from an online service.

Web browsers allow users to browse Internet web pages provided by remote web servers. Generally, each user's browser makes web page requests to the web servers, and in response the web servers obtain the requested web pages and serve those pages back to the user's web browser. The requests and responses often use Hypertext Transport Protocol (HTTP). A typical web page is written in a markup language, such as the Hypertext Markup Language (HTML), and includes a number of embedded objects referenced by respective Uniform Resource Locators (URLs) within the HTML. The HTML of the web page may include many embedded URLs that define other objects within the web page to be obtained by web browser. For example, graphics, images, flash applications, links to other web pages, advertisements, etc. may be defined by embedded URLs. As the web browser encounters objects such as embedded URLs, the web browser repeats the above sequence of processing for the web page in order to obtain each embedded object.

Online services providers often are interested in monitoring activities generated from their web pages. For example, when a user clicks a link embedded on the online services system's web page that takes the user outside of the online service provider's domain into a third party domain, the online services system may want to know how long is spent in the third party domain. There may be various reasons for the desired monitoring, and the online services system can adjust the pricing of, e.g., advertising links if the user behavior is monitored.

Conventional technologies for monitoring and measuring the user's interactions with third-party links and external domain interactions suffer from a variety of deficiencies. For example, conventional technologies require each third party content provider to provide the content, track access, and report to the online services service the results. This process raises two issue: reliability of information from the third party provider and amount of effort required. A third party may pay based on length of time that the user spent on the third party page, e.g., the third party may not pay for lengths shorter than a predetermined threshold. With the third party providing the reporting data, there is a potential for the third party provider to under-report user access to reduce their costs. In addition, the current model requires the third party content provider to provide the platform for the tracking, which requires additional effort and resources.

In addition, some monitoring is performed at the online services system's servers, which may be plural servers that are not necessarily in time synchronization. The difference between timers at different locations may not be an accurate reflection of the time spent away from the servers' domain.

SUMMARY

Embodiments of the invention enable more accurate measurements of a user's browsing of a web page on an external domain, e.g., as a result of selection of a link from a web page of an online services system. The time that a user spends away from the online services system's domain may be a good proxy for the time that the user spent on the web page of the external domain, especially where that external web page is a popup window. To measure this time, in accordance with embodiments of the invention, the online services system directs a user's computer to measure the time that the user is away from the domain of the online services system. By using the user's computer to perform this time measurement, errors due to timing by multiple servers that are not in synchronization can be avoided.

In one implementation, the web page from the online services website includes a script that invokes a timer when the browser application navigates from the online services system's page to a third party page in an external domain. This navigating away from the online services systems web page may be the result of a click on a link on the online services system page. More specifically, when the online services system serves the web page to the user, the user's browser application reads the HTML to render the page, including the script with the timer instruction. When the user leaves the online services system page, the script starts the timer. When the user uses a device (e.g., a browser application running on the device) to navigate to another web page provided by another system rather than the third party page in the external domain, the other web page communicates with the online services system to provide navigation information associated with the user device, and the script stops the timer, computes the time that the user spent away from the online services system, and communicates this duration to the online services system.

BRIEF DESCRIPTION OF THE DRAWINGS

FIG. 4A is an example of one embodiment of a web page of an online services system.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview of an Online Service System Architecture

Figure 1:
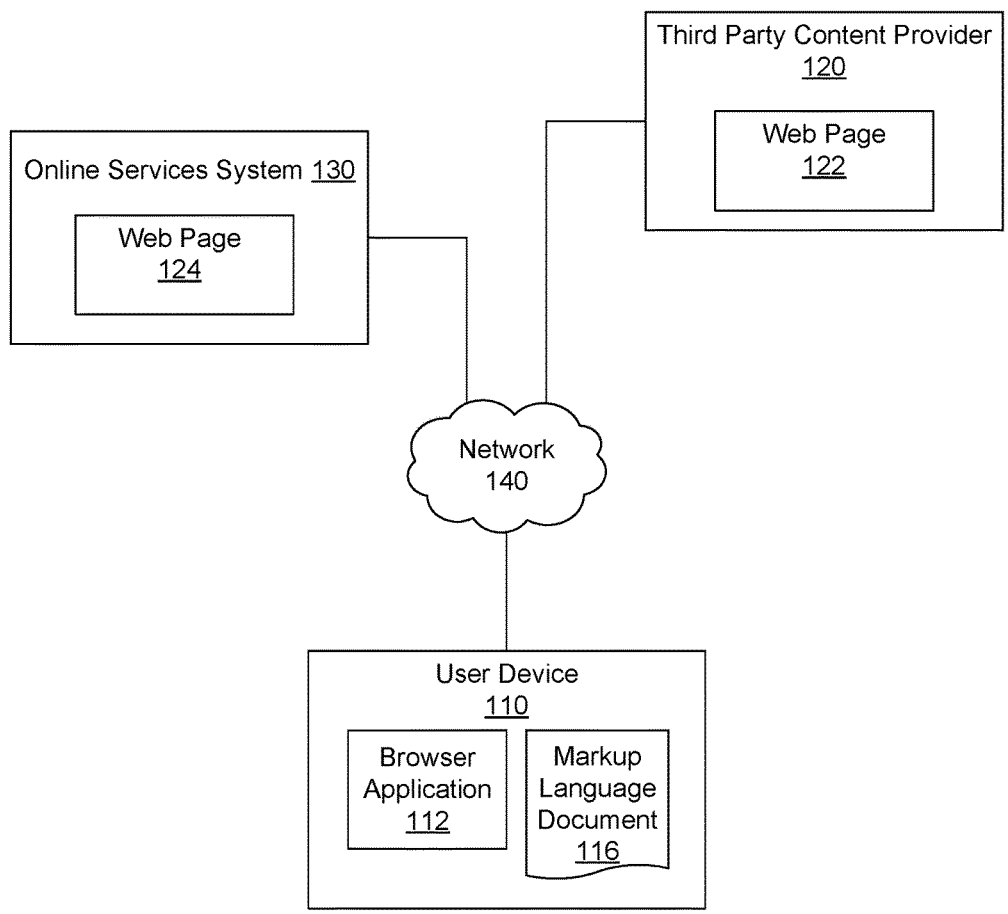
FIG. 1 is a network diagram of one embodiment of a system 100 for measuring interactions of an online services system user with third party content.

FIG. 1 is a network diagram of one embodiment of a system 100 for measuring interactions of an online services system user with third party content. The system 100 includes one or more user devices 110, one or more third party content providers 120, the online services system 130, and a network 140. For purposes of illustration, the embodiment of the system 100 shown by FIG. 1 includes a single third party content provider 120 and a single user device 110. However, in other embodiments, the system 100 may include more user devices 110 and/or more third party content providers 120. In certain embodiments, the online services system 130 is operated by an online services provider, whereas the third party content providers 120 are separate from the online services system 130 in that they may be operated by different entities. In other embodiments, however, the online services system 130 and the third party content providers 120 operate in conjunction to provide online services to users of the online services system 130. In this sense, the online services system 130 provides a platform, or backbone, which other systems, such as third party content providers 120, may use to provide online services and functionalities to users across the Internet, including but not limited to social networking.

A user device 110 comprises one or more computing devices that can receive input from a user and can transmit and receive data via the network 140. For example, the user device 110 may be a desktop computer, a laptop computer, a smart phone, a personal digital assistant (PDAs) or any other device including computing functionality and data communication capabilities. The user device 110 is configured to communicate with the third party content providers 120 and the online services system 130 via the network 140, which may comprise any combination of local area and/or wide area networks, using both wired and wireless communication systems.

In one embodiment, the user device 110 displays content by processing a markup language document 116 received from the online services system 130 or third party content provider 120 using a browser application 112. The markup language document 116 identifies content and one or more instructions describing formatting or presentation of the content. By executing the instructions included in the markup language document 116, the browser application 112 displays the identified content using the format or presentation described by the markup language document 116. For example, the markup language document 116 includes instructions for generating and displaying a web page having content provided by the online services system 130 and links to third party content provided by the third party content providers 120. In various embodiments, the markup language document 116 comprises a data file including extensible markup language (XML) data, extensible hypertext markup language (XHTML) data, or other markup language data. The browser application 112 may be any commercially available web browser, e.g., Internet Explorer, Mozilla Firefox, Safari, Opera, or Google Chrome.

The third party content provider 120 comprises one or more web servers including one or more web pages 122, which are communicated to the user device 110 using the network 140. The third party content provider 120 is separate from the online services system 130. For example, the third party content provider 120 is associated with a first domain while online services website is associated with a separate domain according to one embodiment. A web page 122 provided by the third party content provider 120 comprises a markup language document identifying content and including instructions specifying formatting or presentation of the identified content, as described above. The third party content provider 120 may be an advertiser in one embodiment, which third party provides links on the online services system's website linking to the third party content, e.g., for an advertising fee.

The online services system 130 comprises one or more computing devices providing online services to users. In one embodiment, the online services system 130 may provide users 110 a social network with the ability to communicate and interact with other users of the social network. The online services system 130 is further described below in conjunction with FIG. 2.

The online services system 130 also is capable of linking a variety of entities. For example, the online services system 130 enables users to interact with each other as well as third party content providers 120 or other entities through an API or other communication channels.

In one embodiment, the online services provider 130 servers web pages 124. A web page 124 may include a link comprising a script with instructions that, when executed by a browser application 112 of a user device 110, invokes a timer on the user device 110 browser to track duration of time spent viewing third party content, as estimated based upon the time duration that the user device 110 was away from the online services system's web page.

According to one embodiment, the online services system 130 and the third party content provider 120 interact with the user device 110 using standard client/server architecture. A client (e.g., user device 110) typically is a process that accesses shared network resources provided by another computer (e.g., online services system 130 and/or third party content provider 120). Servers (e.g., online services system 130 and/or third party content provider 120) typically are remote computers accessible over a communications medium. The server receives requests from the user device 110 and filters electronic information to provide responses to the user device 110.

Figure 2:
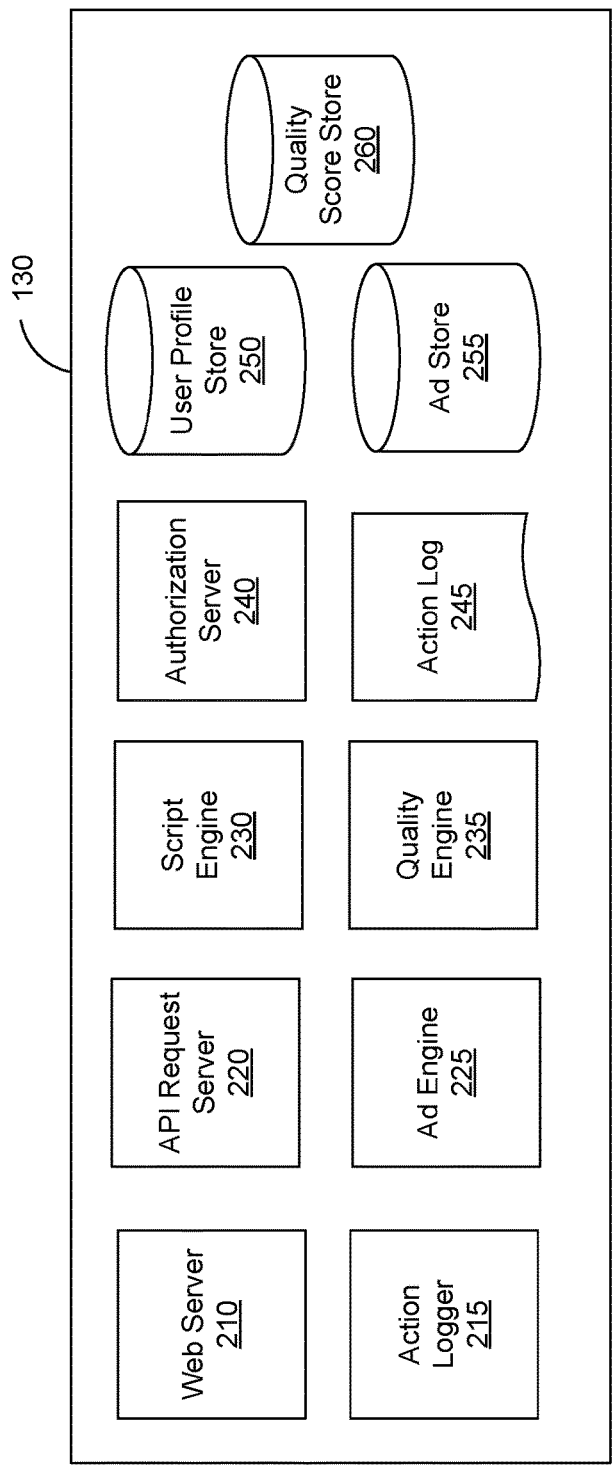
FIG. 2 is a diagram of one embodiment of an online services system 130.

FIG. 2 is a diagram of one embodiment of an online services system 130. The embodiment shown includes a web server 210, an action logger 215, an API request server 220, an advertising engine 225, a script engine 230, a quality engine 235, an authorization server 240, an action log 245, a user profile store 250, an advertising store 255, and a quality score store 260. In other embodiments, the online services system 130 may include additional, fewer, or different modules for various applications. Conventional components such as network interfaces, security mechanisms, load balancers, failover servers, management and network operations consoles, and the like are not shown so as to not obscure the details of the system.

As described above in conjunction with FIG. 1, the online services system 130 comprises a computing system that allows users to communicate or otherwise interact with each other and access content as described herein. The online services system 130 stores user profiles. The user profiles include biographic, demographic, and other types of descriptive information, such as work experience, educational history, hobbies or preferences, location, and the like. The web server 210 links the online services system 130 to one or more user devices 110 and/or one or more third party content providers 120 via the network 140. The web server 210 serves web pages, as well as other web-related content, such as Java, Flash, XML, and so forth. The web server 210 may include a mail server or other messaging functionality for receiving and routing messages between the online services system 130 and one or more user devices 110.

The Application Programming Interface (API) request server 220 allows one or more third party content providers 120 to access information from the online services system 130 by calling one or more APIs. The API request server 220 also may allow third party content providers 120 to send information to online services system 130 by calling APIs. For example, a third party content provider 120 sends an API request to the online services system 130 via the network 140 and the API request server 220 receives the API request. The API request server 220 processes the request by calling an API associated with the API request to generate an appropriate response, which the API request server 220 communicates to the third party content provider 120 via the network 140. For example, responsive to an API request, the API request server 220 collects data associated with a user and communicates the collected data to the third party content provider 120.

The action logger 215 is capable of receiving communications from the web server 210 about user actions. The action logger 215 populates the action log 245 with information about user actions, allowing the online services system 130 to track various actions taken by its users inside and outside of the online services system 130. Any action that a particular user takes with respect to another user is associated with each user's profile, e.g., as stored in the user profile store 250. Examples of actions taken by a user within the online services system 130 that are identified and stored may include, for example, adding a connection to another user, sending a message to another user, reading a message from another user, viewing content associated with another user, attending an event posted by another user, or clicking on an advertisement link in the online services system 130 web page. When a user takes an action within the online services system 130, the action is recorded in an action log 245. In one embodiment, the online services system 130 maintains the action log 245 as a database of entries. When an action is taken within the online services system 130, an entry for the action is added to the action log 245.

Additionally, user actions may be associated with an entity outside of the online services system 130, such as a third party content provider 120 that is separate from the online services system 130. For example, the action logger 215 receives data describing a user's interaction with a third party content provider 120 from the web server 210. Examples of scenarios in which a user interacts with an third party content provider 120 include a user expressing an interest in an third party content provider 120 or another entity, a user posting a comment to the online services system 130 that discusses a third party content provider 120 or a web page 122 within the third party content provider 120, a user posting to the online services system 130 a Uniform Resource Locator (URL) or other identifier associated with the third party content provider 120, a user attending an event associated with the third party content provider 120 or any other action by a user that is related to the third party content provider 120. Thus, the action log 240 may include actions describing interactions between an online services system 130 user and an third party content provider 120 that is separate from the online services system 130.

The advertisement engine 225 is hardware, software, firmware, or any combinations thereof for selecting or prioritizing advertisements to be presented to the users 110, e.g., as provided by third party content provider 120. The advertisement engine 225 outputs indexes of one or more advertisements selected for presentation to the users 110. If multiple advertisements are to be presented to the users 110, the advertisement engine 225 can prioritize the advertisements. In one embodiment, advertisements are embedded in the content items served by the online service system 130.

The script engine 230 allows the online services system 130 to embed a timer script in the HTML of pages sent to the user device 110 browser, for rendering therein and invoking a timer in the browser. In response to a user 110 request for a page provided by the online services system 130, the online services system page HTML includes a script for invoking a timer on the user device 110 browser application provided by the script engine 230. The script may take the form of any implementation of the ECMAScript language standard that can be used as a client-side script implemented as part of a web browser, e.g., JavaScript, Jscript, or ActionScript. The script includes a timer function in the HTML of the online services system page that interacts with the document object model of the page to invoke a timer on the browser. The script causes the user device 110 browser, upon detection of navigation away from the online services system page, to starts a timer on the user device 110 browser. The script also causes the user device 110 browser, upon detection of return to a web page provided by the online services system 130, to stop the timer on the user device 110 browser, and to send timer information to the online services system 130. The timer information includes the duration that the user device 110 browser was away from the origin domain as a result of the user selection of the third party link.

The quality engine 235 receives the timer and duration information, from which it determines the quality of the user's interaction with the third party content. The quality engine 235 may determine a quality score based on the duration, and/or may compare the duration to a threshold duration and classify the user's interaction with the third party page based on the comparison. In addition, the quality engine 235 may store the classification and/or score, e.g., in quality score store 260.

The duration information can be used by the quality engine 235 in various ways. For example, if the third party content provider 120 is an advertiser and the link an advertising link, the duration can be used to determine an advertising price for display of the advertising link, to determine whether to charge an advertiser (and how much) for providing the advertising link on the web page, and/or the duration information itself may be provided to the advertiser.

The authorization server 240 enforces one or more privacy settings of the users of the online services system 130. A privacy setting of a user determines how particular information associated with a user can be shared. The privacy setting comprises the specification of particular information associated with a user and the specification of the entity or entities with whom the information can be shared. Examples of entities with which information can be shared may include other users, applications, third party content providers 120 or any entity that potentially can access the information. The information that can be shared by a user comprises user profile information such as a profile photo, phone numbers associated with the user, user's connections, actions taken by the user such as adding a connection, changing user profile information, and the like.

The authorization server 240 contains logic to determine if certain information associated with a user can be accessed by a user's friends, third party content providers 120 and/or other applications and entities. For example, a third party content provider 120 that attempts to access a user's comment about a URL associated with the third party content provider 120 must get authorization from the authorization server 240 to access the user's work phone number. Based on the user's privacy settings, the authorization server 240 determines if another user, a third party content provider 120, an application or another entity is allowed to access information associated with the user, including information about actions taken by the user. For example, the authorization server 245 uses a users privacy setting to determine if the user's comment about a URL associated with the third party content provider 120 can be accessed by the third party content provider 120. This enables a user's privacy setting to specify which other users, or other entities, are allowed to receive data about the user's actions or other data associated with the user.

The online services system 130 stores user profiles describing the users of online services in the user profile store 250. The user profiles include biographic, demographic, and other types of descriptive information, such as work experience, educational history, hobbies or preferences, location, and the like. In addition, information specific to actions of a particular user are stored in the user store 250.

The advertisement store 255 is hardware, software, firmware or a combination thereof for storing advertisements and information related to the advertisements. The advertisement store 255 is communicatively connected to the advertising engine 225 to receive advertisements and other related information from the third party content provider 120. The information related to advertisements includes, for example, the characteristics of the products or services being advertised, the profile of targeted users, the bidding price for advertisement that the advertisers are willing to pay for presenting advertisements, the maximum amount of advertisement fee for a predetermined duration (e.g., daily and monthly), and user feedback responses received for the advertisements.

Measuring User Interaction with Third Party Content

Figure 3:
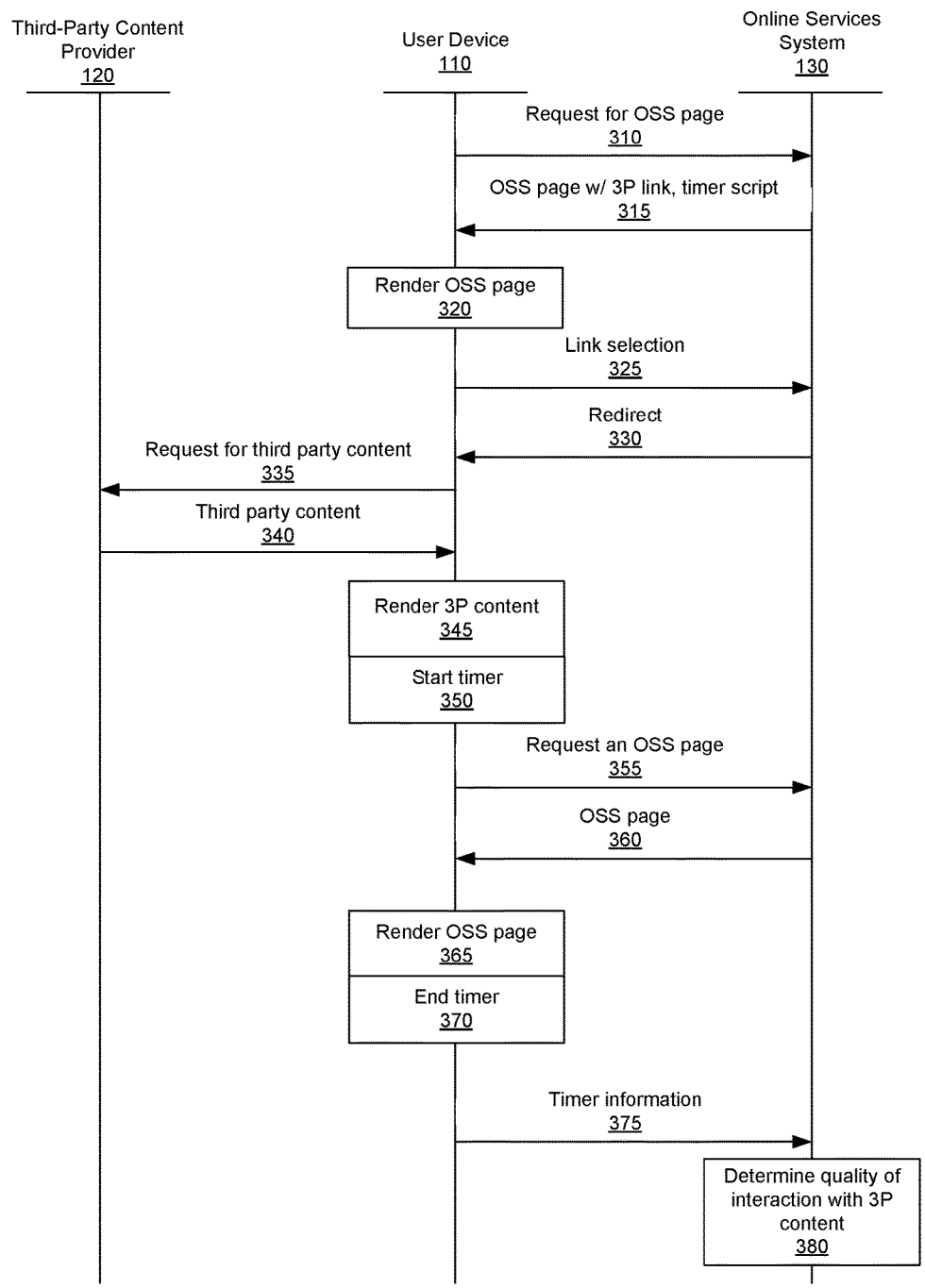
FIG. 3 is an interaction diagram showing a process for measuring a user's interaction with third party content according to one embodiment.

FIG. 3 is an interaction diagram showing a process for measuring a user's 110 interaction with third party content 120 accessed via a link on a page provided by an online services system 130 according to one embodiment.

Figure 4A:
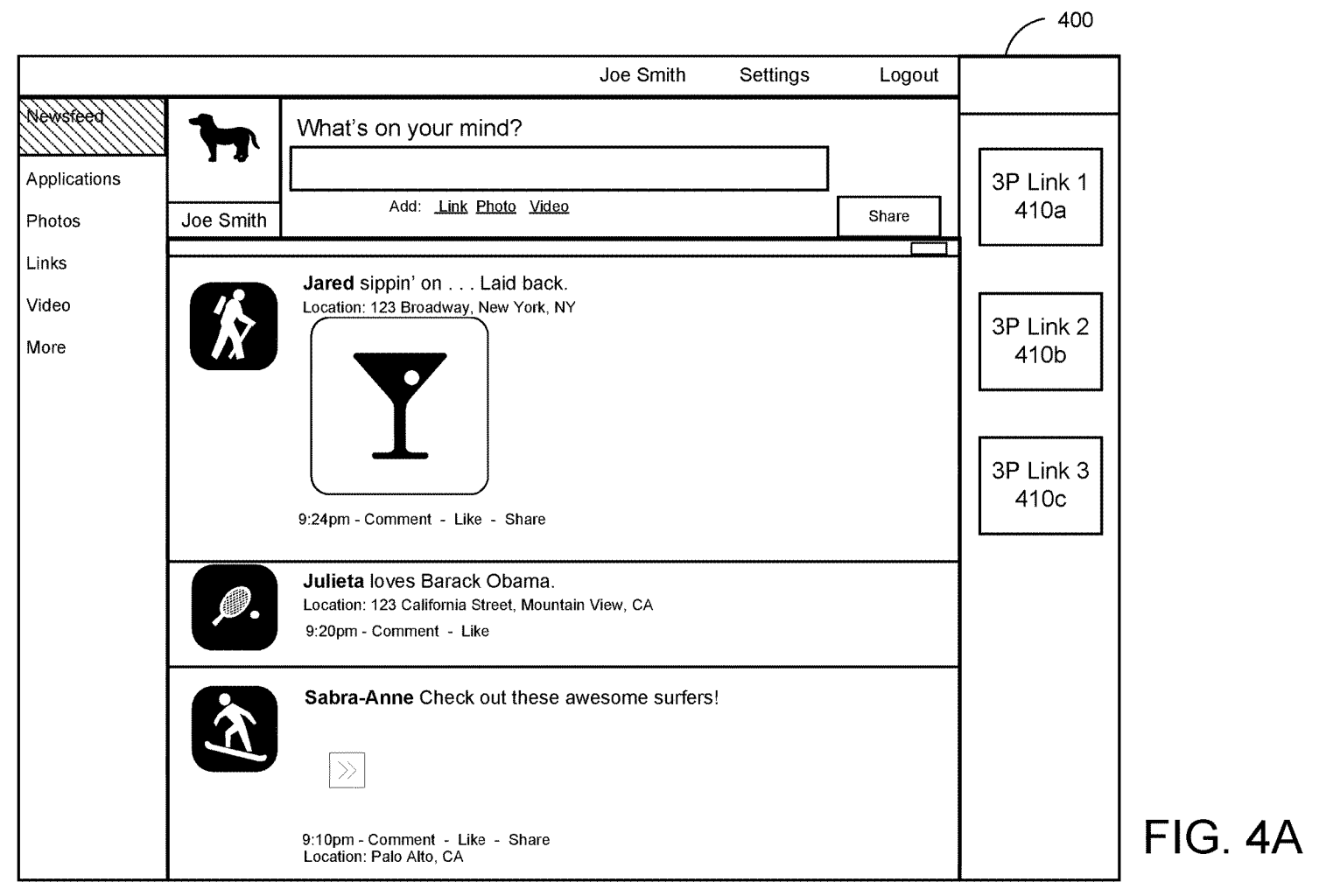

The process begins with a user 110 interacting with an online services system 130. During the course of the interaction, the user 110 views various web pages, e.g., via a browser application executing an HTML document. For each page, the user device 110 transmits, and the online services system 130 receives 310, a request (e.g., an HTTP request) for a page provided by the online services system 130. In response, the online services system 130 provides to 315 the user device 110 the requested online services system page (e.g., via an HTTP response). According to some embodiments, the online services system 130 serves pages in a domain provided by the online services system 130, referred to herein as an origin domain. The pages served by the online services system 130 may be served by a plurality of servers, which may or may not be in time synchronization with each other. Along with the page content, the HTML for the online services system page includes at least one link to third party content (e.g., in the form of an embedded URL), and a script for invoking a timer on the user device 110 browser application as described herein. The script may be any implementation of the ECMAScript language standard that can be used as a client-side script implemented as part of a web browser, e.g., JavaScript, Jscript, or ActionScript. The script includes a timer function in the HTML of the online services system page that interacts with the document object model of the page. The user device 110 browser application then renders 320 the online services system page. An exemplary page 400 is shown in FIG. 4A.

While the user 110 is viewing the online services system page, the page may include one or more links to content provided by a third party 120. Example links 410 are shown in FIG. 4A. Upon selection of a third party link, a request for the link is sent 325 from the user device 110 to the online services system 130. In response, the online services system 130 redirects 330 the user device 110 browser application, thereby sending a request 335 for the content associated with the third party link to the third party content provider 120. In one embodiment, online services system 130 directs the user device away from the origin domain to an external domain hosting the third party content. The third party content provider 120 provides 340 a response including the third party content to the user device 110 browser application for display thereon.

Figure 4B:
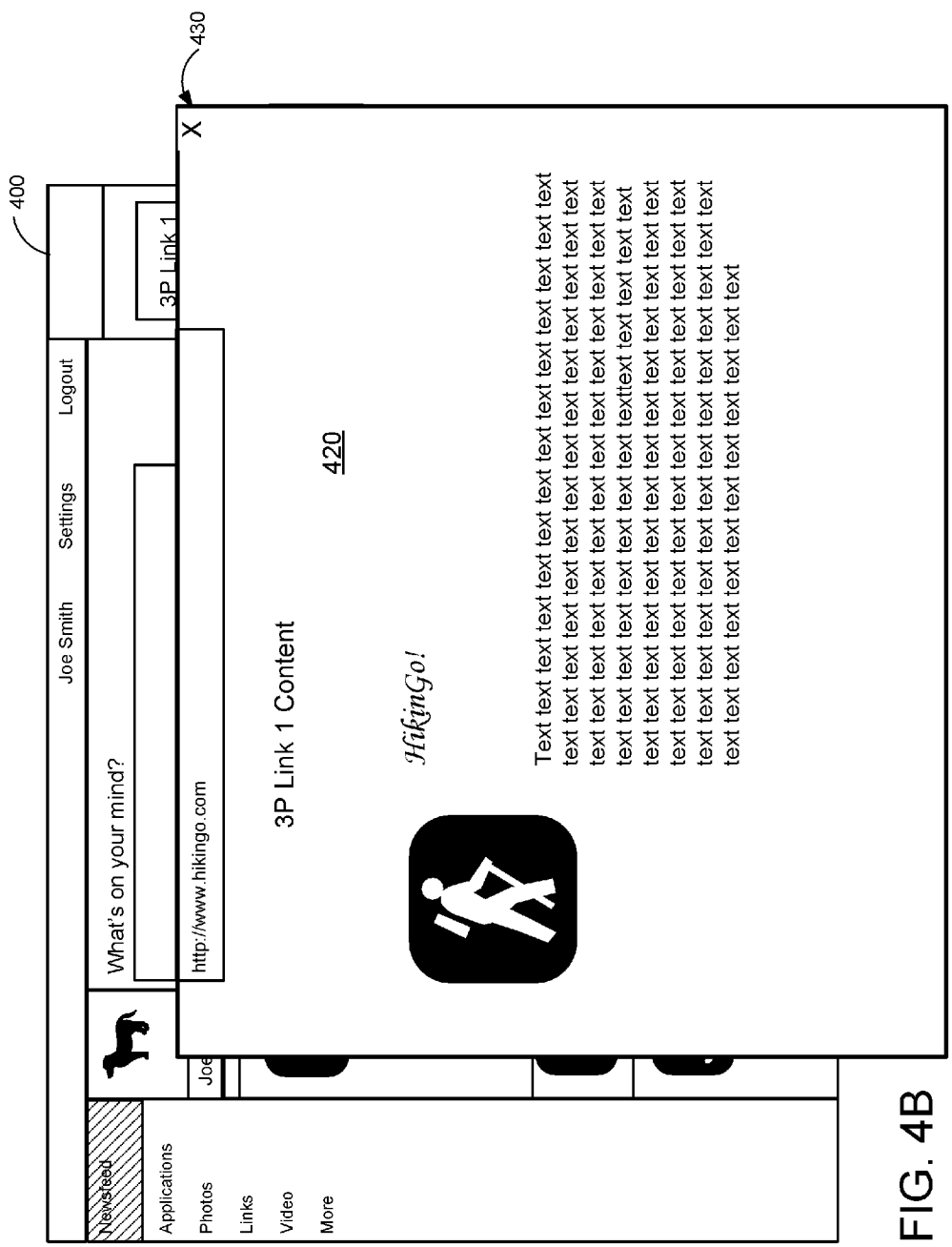
FIG. 4B shows a pop-up window over the online services system page of FIG. 4A.

The user device 110 browser application renders 345 the third party content based on the response 340. In various embodiments, the third party content is a pop-up, other new window, or navigation to a different web page within the existing window. FIG. 4B shows an exemplary pop-up window 420 over the online services system 130 page. Upon detection of navigation away from the online services system page, whether by navigation to a third party content page or by presentation of a third party pop-up window, the script received with the online services system page starts 350 a timer on the user device 110 browser.

Sometime later, the online services system 130 receives 355 a request 355 for an online services system page. The requested 355 page may be the same as the page rendered 320 by the user device 110 browser prior to selecting the third party link, or may be any other page provided by the online services system 130. The online services system 130 sends a response 360 with the requested online services system page to the user device 110 browser, which renders 365 the online services system 130 page. In the case of a third party pop-up window, such as 420 of FIG. 4B, navigation back to the online service systems 130 page may occur by way of closing the pop-up window 420, e.g., via close box 430. As noted above, the online services system 130 uses multiple servers according to one embodiment, so the online services system page served in step 360 may be served from a different server than the online services system in step 315, and the different servers may not be in time synchronization. Upon detection of return to a web page provided by the online services system 130, the script stops 370 the timer on the user device 110 browser and sends timer information 375 to the online services system 130. The timer information acts as a proxy for the duration that the user device 110 browser was away from the origin domain as a result of the user selection of the third party link. In one embodiment, the third party content is in an external domain (external to the origin domain of the online services system 130), and the timer stops 370 in response to detecting a return to the origin domain. In another embodiment, the timer stops 370 in response to detecting a departure from the external domain. For example, other systems providing web page content could be in communication with the online services system 130 and report departure from the third party content if the other systems detect a departure from the external domain, i.e., if the user device 110 does not immediately return to the origin domain/online services system page, but rather to another page in communication with the online services system 130 to provide user navigation information.

From the timer information 375, the online services system 130 determines 380 the quality of the user's interaction with the third party content 340. For example, the online services system 130 may determine a quality score based on the duration, and/or may compare the duration to a threshold duration and classify the user's interaction with the third party page based on the comparison. If a threshold duration is used, it may be determined based on correlation between average duration that user devices are away from the origin domain as a result of selection of third party links and conversion rate for third party content associated with the third party links. For example, a set of third party content visits can be hand annotated into two categories: visits to third party content that led to conversion, and visits that did not. Cross-validation may then be used to find the threshold that maximizes the duration/conversion over the manually annotated set. In addition, the online services system 130 may store the classification and/or score, e.g., in quality score store 260.

The duration information can be used by the online services system 130 in various ways. For example, if the third party content provider 120 is an advertiser and the link is an advertising link, the duration can be used to determine an advertising price for display of the advertising link, to determine whether to charge an advertiser (and how much) for providing the advertising link on the web page, and/or the duration itself may be provided to the advertiser.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    sending, by a first server of a plurality of servers in an origin domain of an online services system, a web page in the origin domain to a user device, the web page including a third party link, the third party link directed to a third party page of information in an external domain;
    sending from the first server to the user device together with the web page in the origin domain, a timer script comprising instructions configured to cause the user device to start a timer upon the user device being directed to the third party page and to stop the timer upon the user device being directed away from the third party page;
    detecting, by the first server of the online services system, a user selection of the third party link on the web page;
    responsive to the user selection of the third party link, directing, by the first server of the online services system, the user device to the third party page in the external domain, the third party page configured to be displayed on the user device;
    following the user device navigating away from the third party page in the external domain, obtaining, by the first server of the online services system from the user device, a duration of time recorded by the timer representing a time spent by the user device on the third party page in the external domain; and
    determining a quality score for an interaction with the third party page based on the duration representing the time spent on the third party page in the external domain.

2. The method of claim 1, wherein the third party web page provided in the external domain communicates with a second server of the plurality of servers.

3. The method of claim 2, wherein the first and the second of the plurality of servers in the origin domain are not the same.

4. The method of claim 2, wherein the first and the second of the plurality of servers in the origin domain are not in time synchronization.

5. The method of claim 1, further comprising:
    comparing the duration during which the user device was on the third party page in the external domain to a threshold duration; and
    classifying an interaction of a user with the third party page based on the comparing.

6. The method of claim 5, further comprising:
    storing the classification of the interaction of the user with the third party page as data associated with the user.

7. The method of claim 5, wherein the threshold duration is determined based on a correlation between, for a plurality of users, an average duration that user devices are away from the origin domain as a result of selection of third party links and a conversion rate for third party content associated with the third party links.

8. A non-transitory computer-readable medium comprising computer program instructions that when executed by a computer processor of an online system causes the processor to perform steps comprising:
sending, by a first server of a plurality of servers in an origin domain of an online services system, a web page in the origin domain to a user device, the web page including a third party link, the third party link directed to a third party page of information in an external domain;
sending from the first server to the user device together with the web page in the origin domain, a timer script comprising instructions configured to cause the user device to start a timer upon the user device being directed to the third party page and to stop the timer upon the user device being directed away from the third party page;
detecting, by the first server of the online services system, a user selection of the third party link on the web page;
responsive to the user selection of the third party link, directing, by the first server of the online services system, the user device to the third party page in the external domain, the third party page configured to be displayed on the user device;
following the user device navigating away from the third party page in the external domain, obtaining, by the first server of the online services system from the user device, a duration of time recorded by the timer representing a time spent by the user device on the third party page in the external domain; and
determining a quality score for an interaction with the third party page based on the duration representing the time spent on the third party page in the external domain.

9. The non-transitory computer-readable medium of claim 8, wherein the third party web page provided in the external domain communicates with a second server of the plurality of servers.

10. The non-transitory computer-readable medium of claim 9, wherein the first and the second of the plurality of servers in the origin domain are not the same.

11. The non-transitory computer-readable medium of claim 9, wherein the first and the second of the plurality of servers in the origin domain are not in time synchronization.

12. The non-transitory computer-readable medium of claim 8, further comprising:
comparing the duration during which the user device was on the third party page in the external domain to a threshold duration; and
classifying an interaction of a user with the third party page based on the comparing.

13. The non-transitory computer-readable medium of claim 12, further comprising:
storing the classification of the interaction of the user with the third party page as data associated with the user.

14. The non-transitory computer-readable medium of claim 12, wherein the threshold duration is determined based on a correlation between, for a plurality of users, an average duration that user devices are away from the origin domain as a result of selection of third party links and a conversion rate for third party content associated with the third party links.

15. A server for an online system comprising:
a processor; and
non-transitory computer-readable medium comprising computer program instructions that when executed by the processor causes the processor to perform steps comprising:
sending, by a first server of a plurality of servers in an origin domain of an online services system, a web page in the origin domain to a user device, the web page including a third party link, the third party link directed to a third party page of information in an external domain;
sending from the first server to the user device together with the web page in the origin domain, a timer script comprising instructions configured to cause the user device to start a timer upon the user device being directed to the third party page and to stop the timer upon the user device being directed away from the third party page;
detecting, by the first server of the online services system, a user selection of the third party link on the web page;
responsive to the user selection of the third party link, directing, by the first server of the online services system, the user device to the third party page in the external domain, the third party page configured to be displayed on the user device;
following the user device navigating away from the third party page in the external domain, obtaining, by the first server of the online services system from the user device, a duration of time recorded by the timer representing a time spent by the user device on the third party page in the external domain; and
determining a quality score for an interaction with the third party page based on the duration representing the time spent on the third party page in the external domain.

16. The server of claim 15, wherein the third party web page provided in the external domain communicates with a second server of the plurality of servers.

17. The server of claim 16, wherein the first and the second of the plurality of servers in the origin domain are not the same.

18. The server of claim 16, wherein the first and the second of the plurality of servers in the origin domain are not in time synchronization.

19. The server of claim 15, further comprising:
determining a quality score for an interaction of a user with the third party page based on the duration during which the user device on the third party page in the external domain.

20. The server of claim 15, further comprising:
comparing the duration during which the user device was on the third party page in the external domain to a threshold duration; and
classifying an interaction of a user with the third party page based on the comparing.

* * * * *

UNITED STATES PATENT AND TRADEMARK OFFICE
CERTIFICATE OF CORRECTION

PATENT NO. : 10,121,155 B2
APPLICATION NO. : 15/652738
DATED : July 18, 2017
INVENTOR(S) : Thomas Giovanni Carriero Page 1 of 1

It is certified that error appears in the above-identified patent and that said Letters Patent is hereby corrected as shown below:

In the Claims

Column 12, Claim 19, Line 55, delete "during which the user device on the third party page" and insert -- during which the user device was on the third party page --

Signed and Sealed this
Sixteenth Day of July, 2019

Andrei Iancu
*Director of the United States Patent and Trademark Office*